US012590838B2

(12) United States Patent
Jeong et al.

(10) Patent No.: US 12,590,838 B2
(45) Date of Patent: Mar. 31, 2026

(54) ULTRATHIN MICRO-SPECTROMETER AND METHOD OF MANUFACTURING THE SAME

(71) Applicant: KOREA ADVANCED INSTITUTE OF SCIENCE AND TECHNOLOGY, Daejeon (KR)

(72) Inventors: Ki Hun Jeong, Daejeon (KR); Jung Woo Park, Daejeon (KR); Jae Hun Jeon, Daejeon (KR); Gi Beom Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 137 days.

(21) Appl. No.: 18/010,430

(22) PCT Filed: Sep. 7, 2022

(86) PCT No.: PCT/KR2022/013445
§ 371 (c)(1),
(2) Date: Dec. 14, 2022

(87) PCT Pub. No.: WO2023/163304
PCT Pub. Date: Aug. 31, 2023

(65) Prior Publication Data
US 2024/0102859 A1 Mar. 28, 2024

(30) Foreign Application Priority Data

Feb. 24, 2022 (KR) ........................ 10-2022-0024593

(51) Int. Cl.
*G01J 3/02* (2006.01)
*G01J 3/04* (2006.01)
(Continued)

(52) U.S. Cl.
CPC ........... *G01J 3/0259* (2013.01); *G01J 3/0208* (2013.01); *G01J 3/021* (2013.01); *G01J 3/04* (2013.01); *G01J 3/18* (2013.01); *G01J 3/2803* (2013.01)

(58) Field of Classification Search
CPC .. G01J 3/0208; G01J 3/021; G01J 3/04; G01J 3/18; G01J 3/0259; G01J 3/2803; G01J 3/0256
See application file for complete search history.

(56) References Cited

U.S. PATENT DOCUMENTS 5,920,418 A * 7/1999 Shiono ................. H04N 5/7416
                                                              359/254
7,330,258 B2 * 2/2008 Warren ................. G01J 3/0208
                                                              356/328
(Continued)

FOREIGN PATENT DOCUMENTS

EP        3104144        12/2016
KR   10-2010-0017079     2/2010
(Continued)

OTHER PUBLICATIONS

John M. Waechter Jr. Ph.D. et al., "Epoxy Compounds—Olefin Oxides, Aliphatic Glycidyl Ethers and Aromatic Monoglycidyl Ethers", Patty's Toxicology, Abstract, Apr. 16, 2001 (Year: 2001).*
(Continued)

*Primary Examiner* — Tarifur R Chowdhury
*Assistant Examiner* — Joshua M Carlson
(74) *Attorney, Agent, or Firm* — EVAN LAW GROUP LLC

(57) ABSTRACT
The disclosure relates to an ultrathin micro-spectrometer and a method of manufacturing the same, and more particularly, relates to an ultrathin micro-spectrometer including: a lens portion including: a convex lens; and a back-reflection grating layer which is formed on a rear surface of the convex
(Continued)

lens and on the same surface of which a reflective diffraction grating and a first planar reflector are arranged; a substrate layer which is disposed to be spaced apart from the lens portion and on which a light incidence microslit is formed; a second planar reflector which is formed on the substrate layer; and a complementary metal-oxide-semiconductor (CMOS) sensor on which light reflected by the lens portion is focused, and a method of manufacturing the same.

14 Claims, 7 Drawing Sheets

(51) Int. Cl.
 *G01J 3/18* (2006.01)
 *G01J 3/28* (2006.01)

(56) References Cited

U.S. PATENT DOCUMENTS

| | | | | |
|---|---|---|---|---|
| 9,594,201 | B2 * | 3/2017 | Clemens | G03H 1/0248 |
| 10,120,112 | B2 * | 11/2018 | Tabirian | A61F 2/1618 |
| 2005/0052647 | A1 | 3/2005 | Lerner | |
| 2009/0262346 | A1 | 10/2009 | Egloff et al. | |
| 2009/0310135 | A1 * | 12/2009 | Bockstaele | G01J 3/02 |
| | | | | 359/566 |

| | | | | |
|---|---|---|---|---|
| 2011/0228267 | A1 * | 9/2011 | Hayashi | G02B 5/32 |
| | | | | 359/15 |
| 2012/0147369 | A1 * | 6/2012 | Shibayama | G01J 3/0259 |
| | | | | 356/300 |
| 2015/0021480 | A1 * | 1/2015 | Chrisp | G01J 3/021 |
| | | | | 250/339.05 |
| 2015/0204511 | A1 * | 7/2015 | Rudmann | G01J 3/1804 |
| | | | | 362/346 |
| 2017/0030773 | A1 | 2/2017 | Han et al. | |
| 2018/0274977 | A1 * | 9/2018 | Baik | G02B 5/1809 |
| 2020/0209728 | A1 | 7/2020 | Tian et al. | |
| 2020/0340859 | A1 * | 10/2020 | Meng | G01J 3/1838 |

FOREIGN PATENT DOCUMENTS

| | | |
|---|---|---|
| KR | 10-1535209 | 7/2015 |
| KR | 10-2114161 | 5/2020 |

OTHER PUBLICATIONS

Park, J-W. et al., "Optical evaluation of ultrathin back-reflection grating microspectrometer with improved spectral resolution", SPIE Advanced Biophotonics Conference 2021 (SPIE ABC 2021), Nov. 6, 2021.

Park, J. et al., "Compact and ultrathin back-reflection grating spectrometer with improved spectral resolution", SPIE Photonic West 2022, OPTO (14:00, Jan. 25), Jan. 25, 2022.

* cited by examiner

• Concave grating

• Back-reflection grating

ULTRATHIN MICRO-SPECTROMETER AND METHOD OF MANUFACTURING THE SAME

TECHNICAL FIELD

The disclosure relates to an ultrathin micro-spectrometer and a method of manufacturing the same.

BACKGROUND ART

In a diffraction grating-based spectrometer, incident light passes through the processes of collimation, diffraction, and focusing to reach a detector, and optical components such as an incidence portion, a reflector, a diffraction grating, and the like may be measured by the detector through typical arrangement of the Czerny-Tumer/Fastie-Ebert structure. The diffraction grating-based spectrometer has a significantly low spectral resolution in the process of precise arrangement of the optical components, and thus a volume thereof inevitably increases to secure a minimum optical path. Recently, the size reduction of the diffraction grating-based spectrometer has been proposed, and research on the size reduction and structural improvement of the optical components is being actively conducted through micro-machining in order to reduce the size of a spectroscopic device of the related art. A concave grating structure, which is typically used in the field of spectroscopy, may perform the functions of collimation, diffraction, and focusing at the same time to minimize an optical path from an incidence portion to a detector, thereby achieving the size reduction of a spectroscopic device. However, in the concave grating-based spectrometer, since a focus according to a wavelength forms a Rowland profile, the spectral resolution measured by a linear detector may deteriorate and the spectrometer may show non-uniform sensitivity, thereby deteriorating overall spectral performance.

DISCLOSURE OF THE INVENTION

Technical Goals

In order to solve the aforementioned problems, the disclosure provides an ultrathin micro-spectrometer capable of showing an improved spectral resolution and uniform sensitivity, compared to a concave grating-based spectrometer of the related art, by utilizing a back-reflection grating structure.

The disclosure provides a method of manufacturing an ultrathin micro-spectrometer capable of manufacturing optical components, such as a diffraction grating, a reflector, an incidence portion, and the like through micro-machining on a large surface, and providing an ultrathin micro-spectrometer which may be mass-produced at low cost.

However, aspects to be achieved in the present disclosure are not limited to the above-described aspects, and other aspects not mentioned herein may be clearly understood by a person having ordinary skill in the art to which the present disclosure pertains from the following description.

Technical Solutions

According to an embodiment of the disclosure, there is provided an ultrathin micro-spectrometer including: a lens portion including a convex lens; and a back-reflection grating layer which is formed on a rear surface of the convex lens and on the same surface of which a reflective diffraction grating and a first planar reflector are arranged; a substrate layer which is disposed to be spaced apart from the lens portion and on which a light incidence microslit is formed; a second planar reflector which is formed on the substrate layer; and a complementary metal-oxide-semiconductor (CMOS) sensor on which light reflected by the lens portion is focused.

According to an embodiment of the disclosure, the back-reflection grating layer may include a base substrate; a reflective diffraction grating region which is formed on one surface of the base substrate; and a first planar reflector region which is formed on the same surface as the reflective diffraction grating region.

According to an embodiment of the disclosure, the diffraction grating is a plurality of linear patterns formed on the base substrate, and the linear patterns may include an oxide. According to an embodiment of the disclosure, the first planar reflector and the reflective diffraction grating may include a metal coating layer, and the reflective diffraction grating may include the metal coating layer which is the same as or different from the metal coating layer of the first planar reflector.

According to an embodiment of the disclosure, the metal coating layer may include at least one or more selected from a group consisting of silver (Ag), palladium (Pd), gold (Au), copper (Cu), bismuth (Bi), germanium (Ge), gallium (Ga), and aluminum (Al).

According to an embodiment of the disclosure, a thickness of the metal coating layer may be 50 micrometers ($\mu$m) to 100 $\mu$m, and the metal coating layer may be a single layer or a plurality of layers.

According to an embodiment of the disclosure, the linear patterns may include at least one or more of a period of 1 $\mu$m to 2 $\mu$m, a height of 100 nanometers (nm) to 200 nm, a line thickness of 500 nm to 900 nm, and a duty cycle of 0.4 to 0.5, and a cross-section of the linear pattern may include at least one or more of a rectangle, a square, a lenticular shape, a semicircle, and a triangle.

According to an embodiment of the disclosure, the base substrate may be a transparent substrate, and the transparent substrate may include at least one or more of glass, sapphire, a transparent wafer, and transparent plastic.

According to an embodiment of the disclosure, the microslit may be for light to be incident to the first planar reflector.

According to an embodiment of the disclosure, a distance between the microslit and the first planar reflector may be 4 mm to 8 mm.

According to an embodiment of the disclosure, light incident through the microslit may be collimated from the first planar reflector to the second planar reflector, and the light reflected by the second planar reflector may be focused on the CMOS sensor through the back-reflection grating layer.

According to an embodiment of the disclosure, the light focused on the CMOS sensor may be visible light at a wavelength of 350 nm to 800 nm, and may be focused light having multiple wavelengths.

According to an embodiment of the disclosure, there is provided a method of manufacturing an ultrathin micro-spectrometer, the method including the steps of: forming a back-reflection grating layer; and disposing the back-reflection grating layer on a lens; in which the forming of the back-reflection grating layer includes the steps of: preparing a base substrate; forming an oxide layer on the base substrate; forming a photoresist layer on at least a portion of the oxide layer; performing a photolithography process on the photoresist layer; forming a diffraction grating structure by patterning the oxide layer; and depositing a metal layer on a diffraction grating region and a planar reflection region after removing a photoresist from the oxide layer.

According to an embodiment of the disclosure, the disposing of the back-reflection grating layer on the lens may include positioning a surface of the base substrate of the back-reflection grating layer on a rear surface of the lens.

Effects

According to an embodiment of the disclosure, the disclosure may provide an ultrathin micro-spectrometer having improved spectral resolution by utilizing a back-reflection grating structure which performs the functions of the planar reflector and the diffraction grating at the same time.

According to an embodiment of the disclosure, the disclosure may improve the resolution of the micro-spectrometer by minimizing chromatic aberration and provide improved spectral resolution and uniform sensitivity in a visible light range by designing a multi-reflection structure in an optical path and minimum refraction of diffracted light, and thus the ultrathin micro-spectrometer may have versatility for various measurement signals compared to a micro-spectrometer of the related art.

According to an embodiment of the disclosure, the disclosure may manufacture optical components such as a diffraction grating, an incidence portion, and the like through micro-machining on a large surface, and may manufacture an ultrathin micro-spectrometer which may be mass-produced at low cost accordingly.

BEST MODE FOR CARRYING OUT THE INVENTION

Figure 1:
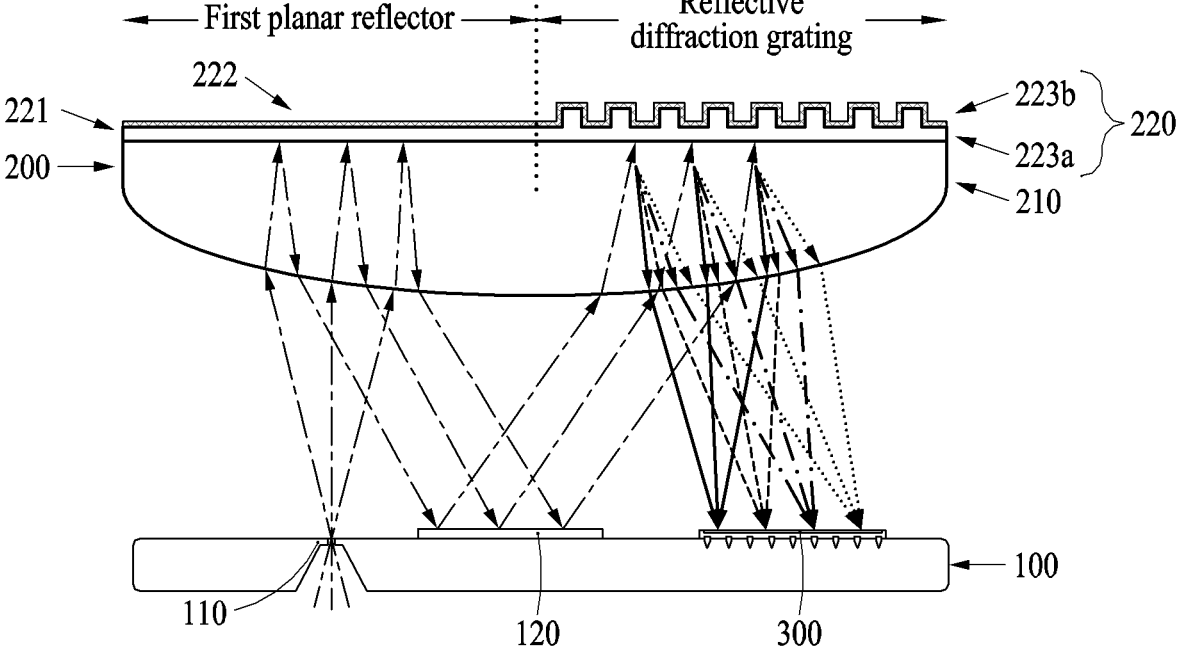
FIG. 1 illustrates an example of a configuration of an ultrathin micro-spectrometer of the disclosure according to an embodiment of the disclosure.

Hereinafter, embodiments of the present disclosure will be described in detail with reference to the accompanying drawings. When it is determined detailed description related to a related known function or configuration they may make the purpose of the present disclosure unnecessarily ambiguous in describing the present disclosure, the detailed description will be omitted here. In addition, terminologies used herein are defined to appropriately describe the embodiments and thus may be changed depending on a user, the intent of an operator, or a custom of a field to which the present disclosure pertains. Accordingly, the terminologies must be defined based on the following overall description of the present specification. In the drawings, like reference numerals are used for like elements.

In the whole specification, when a member is positioned "on" the other member, this not only includes a case that the any member is brought into contact with the other member, but also includes a case that another member exists between two members.

In the whole specification, if a prescribed part "includes" a prescribed element, this means that another element may be further included instead of excluding another element.

Hereinafter, an ultrathin micro-spectrometer of the disclosure, a method of manufacturing the same, and utilization thereof will be described in detail with reference to the embodiments and the drawings. However, the present disclosure is not limited to the embodiments and drawings.

The disclosure relates to an ultrathin micro-spectrometer and, referring to FIG. 1, the ultrathin micro-spectrometer according to an embodiment of the disclosure may include a substrate layer 100, on which optical components are mounted; a lens portion 200 which is disposed to be spaced apart from the substrate layer 100 in a vertical direction and includes a back-reflection grating structure; and a detector 300 where light diffracted and reflected by the lens portion 200 is focused.

According to an embodiment of the disclosure, referring to FIG. 1, the substrate layer 100 may include optical components, such as a light incidence slit 110, a second planar reflector 120, and the like which are mounted thereon. In an example of the disclosure, the light incidence slit 110 may be a microslit and may be integrally formed with the substrate layer 100.

In an example of the disclosure, the light incidence slit 110 may be designed such that a slit entrance for light to be incident to a first planar reflector 210 of the lens portion 200 is disposed. In an example of the disclosure, a distance between the light incidence slit 110 and the lens portion 200 (e.g., a first planar reflector 222) may be 4 millimeters (mm) to 8 mm. In the ultrathin micro-spectrometer of the disclosure, as a multi-reflection structure is implemented in one element by utilizing the back-reflection grating structure, an optical path passing through an incidence portion may be minimized to design the micro-spectrometer having an ultra-thin thickness.

In an example of the disclosure, the light incidence slit 110 may include a width of 3 micrometers (μm) to 60 μm, a numerical aperture (NA) of 0.1 to 0.22, or both. For example, the numerical aperture may be 0.11 or 0.22.

In an example of the disclosure, the second planar reflector 120 may be formed on one surface of the substrate layer 200, designed to reflect light collimated by the lens portion 200 (e.g., the first planar reflector 222 of FIG. 1), and disposed to be adjacent to the slit entrance. In an example of the disclosure, the second planar reflector 120 may be a metal layer having a function of light reflection and may be a deposited thin film or film. The metal layer may contain metal which is the same as or different from that of the first planar reflector 210. For example, any metal may be applied to the metal layer without limitation as long as it is metal having a function of light reflection, and in some examples, the metal layer may contain metals of Groups III, IV and V of the periodic table of elements. In some examples, the metal layer may contain at least one or more selected from the group consisting of Al, In, Sn, Pb, Sb, Bi, Cu, Ag, Au, Zn, Cd, Hg, Sc, Y, La, Ti, Zr, Hf, V, Nb, Ta, Cr, Mo, W, Fe, Co, Ni, Ru, Rh, Pd, Os, Ir, Pt, Ce, Pr, Nd, Pm, Sm, Eu, Gd, Tb, Dy, Ho, Er, Tm, Yb, Lu, and an alloy thereof. In some examples, the metal layer may contain silver (Ag), palladium (Pd), gold (Au), copper (Cu), bismuth (Bi), germanium (Ge), gallium (Ga), aluminum (Al), or an alloy thereof in consideration of high reflectivity and ease of manufacture. In an example of the disclosure, a thickness of the metal layer may be 50 nm to 100 nm; 50 nm to 80 nm; or 60 nm to 70 nm, and the metal layer may be a single layer or a plurality of layers. In some examples, each of the plurality of layers may have the same or different components, thickness, or both.

According to an embodiment of the disclosure, the lens portion 200 may include a convex lens 210; and a back-reflection grating layer 220 including the first planar reflector 222 and a reflective diffraction grating 223 formed on a rear surface of the convex lens. In an example of the disclosure, the back-reflection grating layer 220 may include a base substrate 221; and a region of the first planar reflector 222 formed on one surface of the base substrate and a region of the reflective diffraction grating 223 formed on the same surface.

In an example of the disclosure, the base substrate 221 may be a substrate containing a transparent material capable of transmitting light, may be a silicon substrate (e.g., a transparent Si wafer or a transparent SiC wafer), a sapphire substrate, a ceramic substrate, a glass substrate (e.g., a glass wafer or quartz), a metal oxide substrate, a transparent plastic substrate, or the like, and may contain at least one or more of, for example, glass, alumina, aluminum oxide (e.g., sapphire), transparent plastic (e.g., a cellulose-based resin, polyethylene terephthalate (PET), polyethylene naphthalate (PEN), a polyethylene resin, a polyvinyl chloride resin, polycarbonate (PC), polyethersulfone (PES), polyetherether ketone (PEEK), polyphenylene sulfide (PPS), polyimide (PI), or polymethyl methacrylate (PMMA).

In an example of the disclosure, in the back-reflection grating layer 220, the first planar reflector 222 and the reflective diffraction grating 223 may be arranged on the same surface, which makes it to perform the functions of the planar reflection and the diffraction grating at the same time on the rear surface of the lens by utilizing the back-reflection grating structure, to provide improved spectral resolution and uniform sensitivity by implementing the multi-reflection structure, compared to a concave grating-based spectrometer of the related art, and to reduce the thickness of the micro-spectrometer through the multi-reflection structure while maintaining a total length of an optical path of incident light. Since the collimation, the diffraction, and focusing of the incident light are performed in one element, refraction of the diffracted light may be minimized thereby improving the spectral resolution and sensitivity.

In an example of the disclosure, the first planar reflector 222 may include a metal coating layer 222, and the metal coating layer 222 may be formed continuously with (that is, one metal coating film) a metal coating layer 223b in the region of the reflective diffraction grating 223 or may be formed separately.

In an example of the disclosure, the metal coating layer 222 may contain metal having a function of light reflection and may be a deposited thin film or film. For example, any metal may be applied to the metal coating layer 222 without limitation as long as it is metal having a function of light reflection, and in some examples, the metal coating layer 221 may contain metals of Groups III, IV and V of the periodic table of elements. In some examples, the metal layer may contain at least one or more selected from the group consisting of Al, In, Sn, Pb, Sb, Bi, Cu, Ag, Au, Zn, Cd, Hg, Sc, Y, La, Ti, Zr, Hf, V, Nb, Ta, Cr, Mo, W, Fe, Co, Ni, Ru, Rh, Pd, Os, Ir, Pt, Ce, Pr, Nd, Pm, Sm, Eu, Gd, Tb, Dy, Ho, Er, Tm, Yb, Lu, and an alloy thereof. In some examples, the metal layer may contain silver (Ag), palladium (Pd), gold (Au), copper (Cu), bismuth (Bi), germanium (Ge), gallium (Ga), aluminum (Al), or an alloy thereof in consideration of high reflectivity and ease of manufacture. In an example of the disclosure, a thickness of the metal coating layer 221 may be 50 nm to 100 nm; 50 nm to 80 nm; or 60 nm to 70 nm, and the metal coating layer 221 may be a single layer or a plurality of layers. In some examples, each of the plurality of layers may have the same or different components, thickness, or both.

In an example of the disclosure, the reflective diffraction grating 223 may perform the functions of back reflection and diffraction grating at the same time, may be formed on the base substrate 221, and may include a diffraction grating structure 223a which are a plurality of linear patterns (e.g., straight line patterns) and the metal coating layer 223b.

In an example of the disclosure, the linear pattern may have at least one or more of a period of 1 μm to 2 μm, a height of 100 nm to 200 nm, a line thickness of 500 nm to 900 nm, and a duty cycle of 0.4 to 0.5. In some examples, the grating period may be 1 μm to 2 μm; 1 μm to 1.8 μm; or 1.5 μm to 1.7 μm. In some examples, the height may be 100 nm to 200 nm; 100 nm to 180 nm; or 100 nm to 150 nm. In some examples, the line thickness may be 500 nm to 900 nm; 500 nm to 850 nm; or 600 nm to 800 nm. In some examples, as shown in FIG. 2C, the linear pattern may have a line thickness of 0.7 μm to 0.8 μm and a period of 1 μm to 1.66 μm, which may minimize the refraction of the diffracted light, such that chromatic aberration at a measurement wavelength may be minimized even with an ultrathin thickness, and the spectral resolution and uniform sensitivity may be provided.

Figures 2A, 2B, 2C:
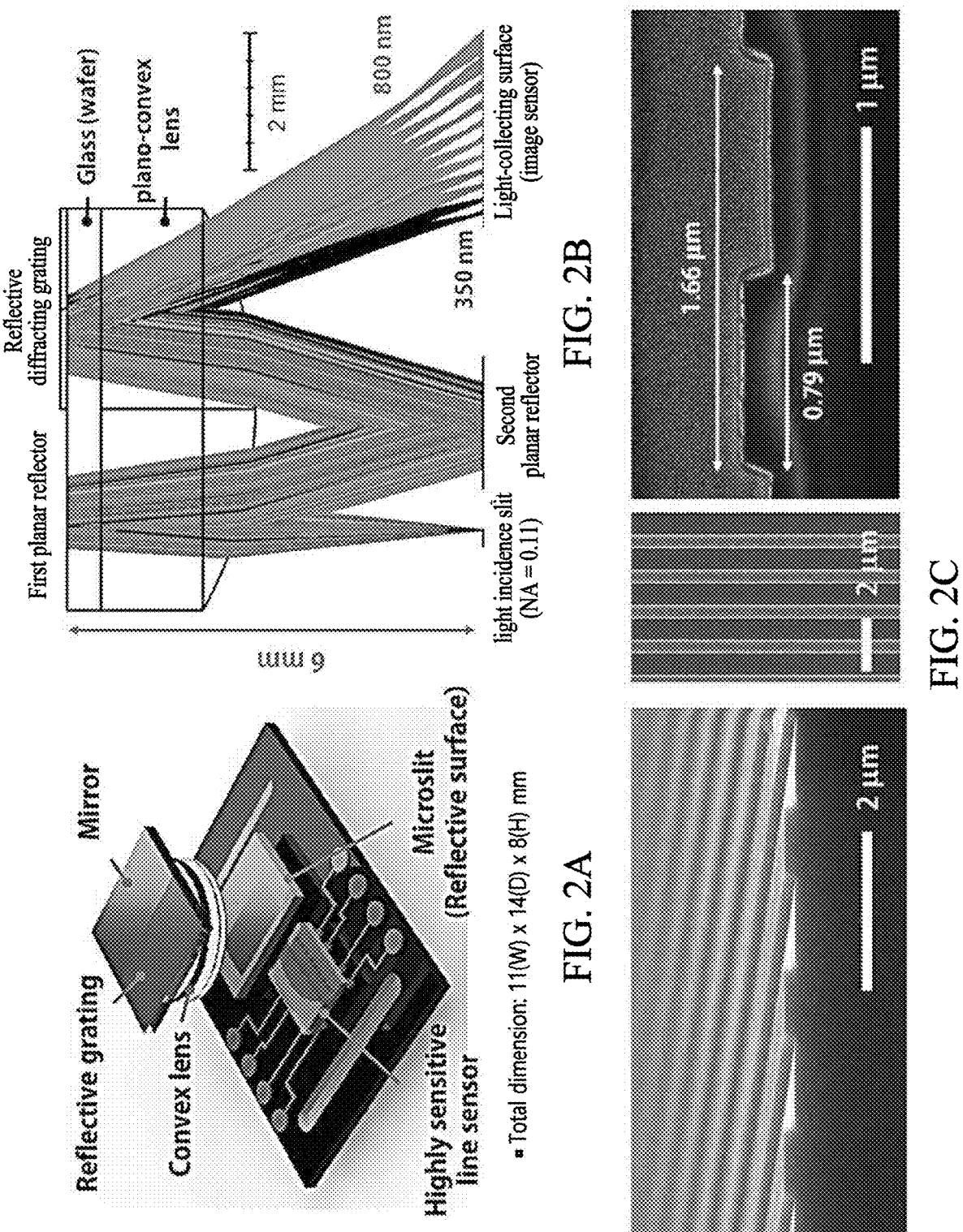
FIG. 2A illustrates a configuration of an ultrathin micro-spectrometer of the disclosure and a configuration of optical components in the micro-spectrometer according to an embodiment of the disclosure.
FIG. 2B illustrates a configuration of an ultrathin micro-spectrometer of the disclosure and an optical path in the micro-spectrometer according to an embodiment of the disclosure.
FIG. 2C illustrates a configuration of an ultrathin micro-spectrometer of the disclosure and a scanning electron microscope (SEM) image of a diffraction grating structure in the micro-spectrometer according to an embodiment of the disclosure.

In an example of the disclosure, a cross-section of the linear pattern may have at least one or more of a rectangle, a square, a lenticular shape, a semicircle, and a triangle, and in some examples, as shown in FIG. 2C, a linear pattern having a rectangular cross-section may be provided.

In an example of the disclosure, the linear pattern may be obtained by patterning a layer of oxide, and the oxide may contain transparent oxide, may be, for example, oxide containing at least one or more of Ti, In, Ga, Zn, Sn and Si, and may be ITO, IGZO, IZO, IGO, or silicon oxide (e.g., $SiO_2$). The linear pattern may further contain silicon nitride (e.g., $Si_xN_y$, $Si_3N_4$), silicon oxynitride ($SiO_xN_y$), and transparent nitride or transparent oxide semiconductor compound. The oxide may be desirably silicon oxide (e.g., $SiO_2$).

In an example of the disclosure, the metal coating layer 223*b* in the region of the reflective diffraction grating 223 may contain metal which is the same as or different from that of the metal coating layer 222 of the first planar reflector, and the type of metal may be the one described above for the metal coating layer 222. In an example of the disclosure, a thickness of the metal coating layer 223*b* may be 50 nm to 100 nm; 50 nm to 80 nm; or 60 nm to 70 nm, and the metal coating layer 223*b* may be a single layer or a plurality of layers. In some examples, each of the plurality of layers may have the same or different components, thickness, or both. When the thickness thereof is in the range described above, a refractive index of light diffracted and reflected may be minimized, and spectral resolution and uniform sensitivity may be provided.

In an example of the disclosure, the detector 300 may analyze and image light information (e.g., a light wavelength) of focused light that is diffracted and reflected by the lens portion. A wavelength of the focused and analyzed light may include a visible light region of a wavelength of 350 nm to 800 nm, and accordingly, the analysis performance may be provided with high spectral resolution and sensitivity over the entire visible light region. In addition, the detector 300 may obtain multiple optical images (e.g., multiple fluorescence images).

In an example of the disclosure, the detector 300 may be an image line sensor, for example, a complementary metal-oxide-semiconductor (CMOS) sensor. For the CMOS sensor, any one may be appropriately selected from those well known in the technical field of the disclosure and is not specifically described here.

In an example of the disclosure, the detector 300 may be mounted on the substrate layer 100, or as shown in FIG. 2A, the substrate layer 100 and the detector 300 may be separately mounted on a substrate on which electrodes and the like for driving the ultrathin micro-spectrometer are formed. For the substrate, any one of those well known in the technical field of the disclosure may be used and is not specifically described here.

According to an embodiment of the disclosure, referring to FIGS. 2A, 2B, and 2C, FIGS. 2A, 2B, and 2C illustrate the configuration of the ultrathin micro-spectrometer according to the disclosure, the configuration of optical components in the micro-spectrometer (FIG. 2A), the optical path (FIG. 2B), and an SEM image of the diffraction grating structure (FIG. 2C), respectively. That is, light incident through a microslit may be collimated from the first planar reflector to the second planar reflector and the light reflected by the second planar reflector may be reflected by the back-reflection grating structure and focused on the detector (e.g., the CMOS line sensor), which may improve spectral resolution and sensitivity and enable the multi-reflection function in one element. Therefore, an ultrathin micro-spectrometer having a thickness of approximately 6 mm may be provided without increasing a volume of the elements or minimizing the volume thereof while minimizing a total optical path of the incident light.

Figure 3:
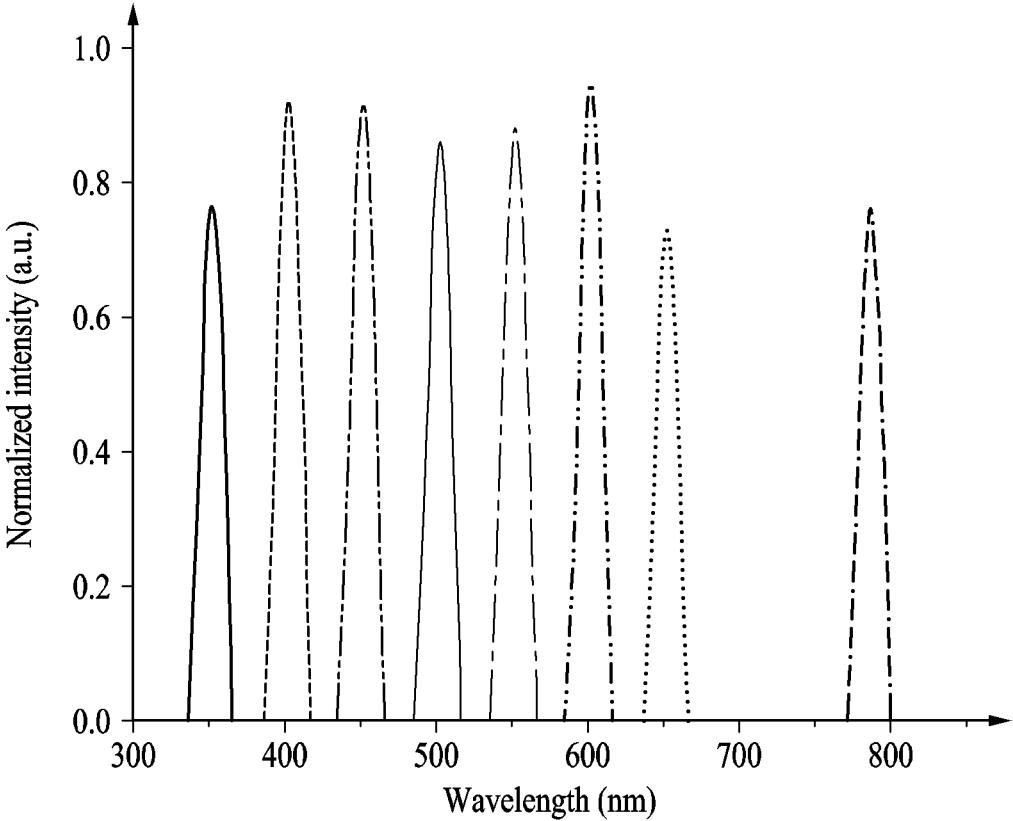
FIG. 3 illustrates a measurement spectrum measured with a tunable laser (tunable laser with 50 nanometers (nm) interval) obtained by an ultrathin micro-spectrometer of the disclosure according to an embodiment of the disclosure.

According to an embodiment of the disclosure, FIG. 3 illustrates a measurement spectrum of a detector (e.g., the CMOS sensor) of the micro-spectrometer based on tunable laser measurement at 50 nm interval of the diffraction grating of the ultrathin micro-spectrometer having the back-reflection grating structure of the disclosure, and it may be confirmed in FIG. 3 that spectroscopic information may be obtained in the entire visible light region.

Figure 4A:
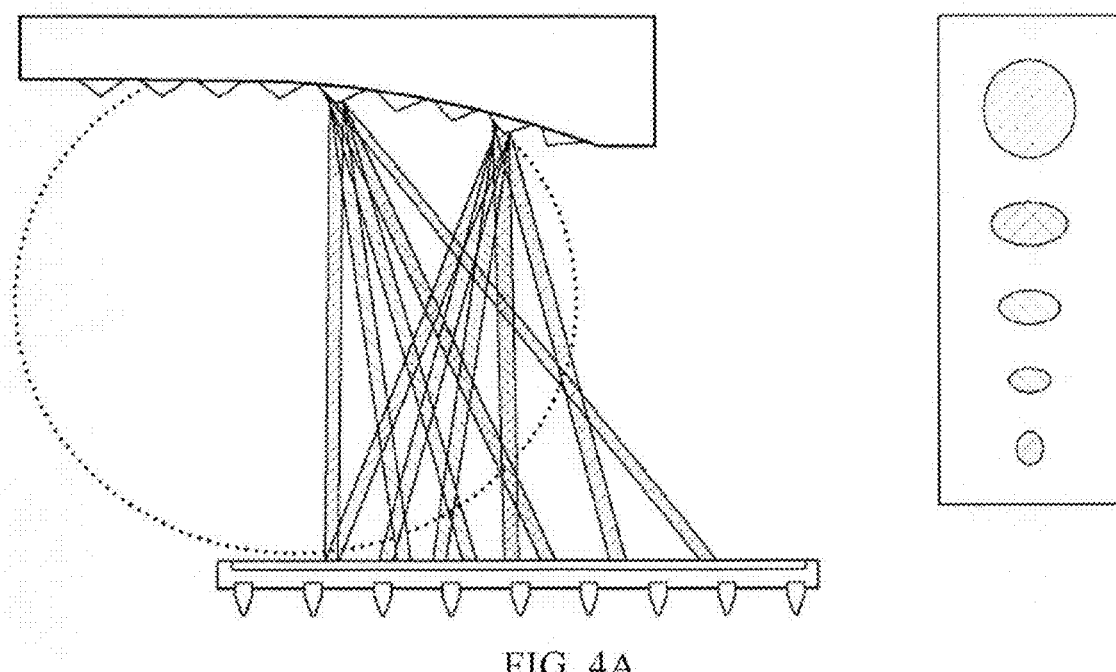
FIG. 4A illustrates a spectral resolution of a micro-spectrometer using a concave grating according to an embodiment of the disclosure.
Figure 4B:
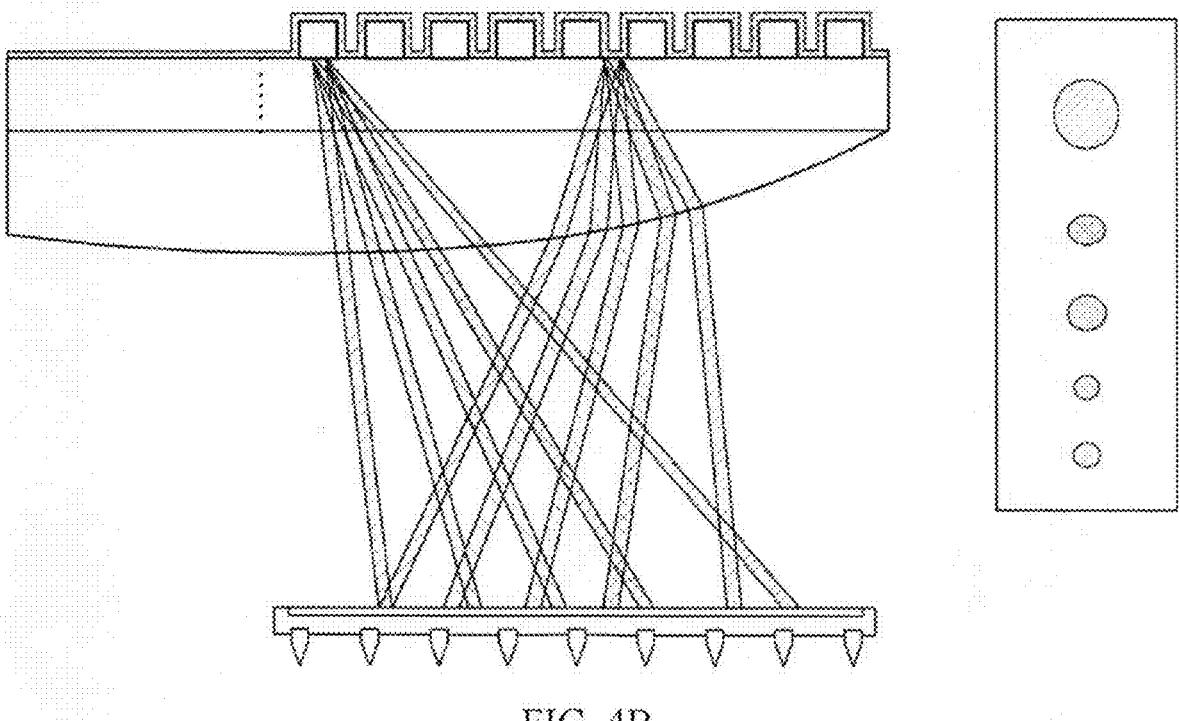
FIG. 4B illustrates a spectral resolution of a micro-spectrometer using an ultrathin micro-spectrometer having a back-reflection grating structure of the disclosure according to an embodiment of the disclosure.
Figures 5A, 5B:
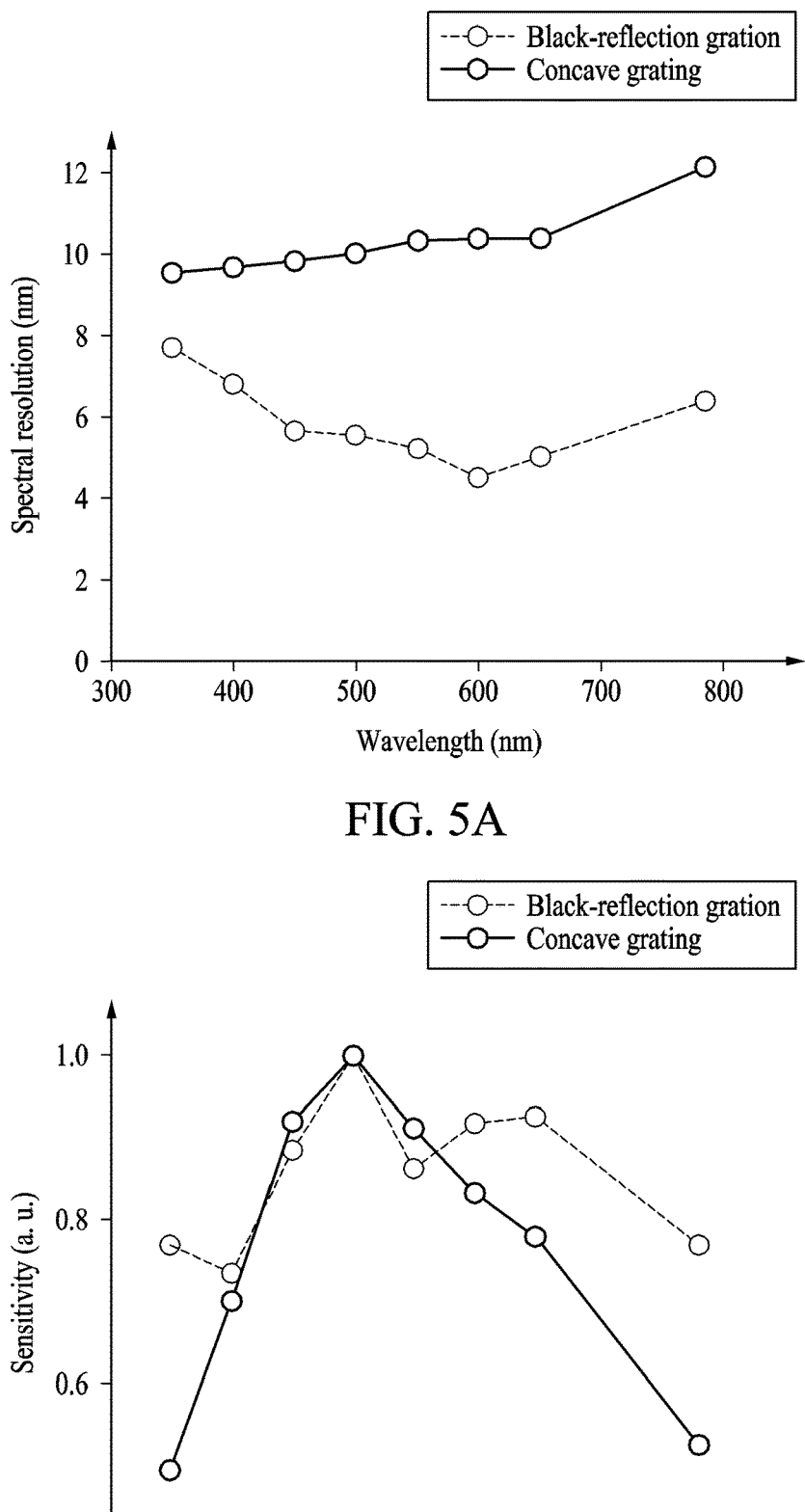
FIG. 5A illustrates spectral resolutions in a visible light region of the micro-spectrometer using the concave grating of FIG. 4A and the ultrathin micro-spectrometer having the back-reflection grating structure of the disclosure of FIG. 4B according to an embodiment of the disclosure.
FIG. 5B illustrates sensitivity of a micro-spectrometer using the micro-spectrometer using the concave grating of FIG. 4A and the ultrathin micro-spectrometer having the back-reflection grating structure of the disclosure of FIG. 4B according to an embodiment of the disclosure.

According to an embodiment of the disclosure, FIGS. 4A and 4B show a comparison of the spectral resolution between the ultrathin micro-spectrometer having the back-reflection grating structure according to the disclosure (FIG. 4B) and a micro-spectrometer using a concave grating (FIG. 4A). In this regard, FIGS. 5A and 5B are graphs comparing the spectral resolution and sensitivity of the micro-spectrometers according to the wavelength of visible light. In FIG. 5A, uniform and minute resolution may be confirmed over the entire visible light region.

In FIG. 5B, the ultrathin micro-spectrometer utilizing the back-reflection grating structure of the disclosure may provide improved spectral resolution and uniform sensitivity, compared to the concave grating-based spectrometer of the related art. In other words, the micro-spectrometer according to the disclosure may provide improved spectral resolution and uniform sensitivity over the entire visible light region, compared to a small spectrometer (e.g., the concave grating) of the related art.

Figure 6:
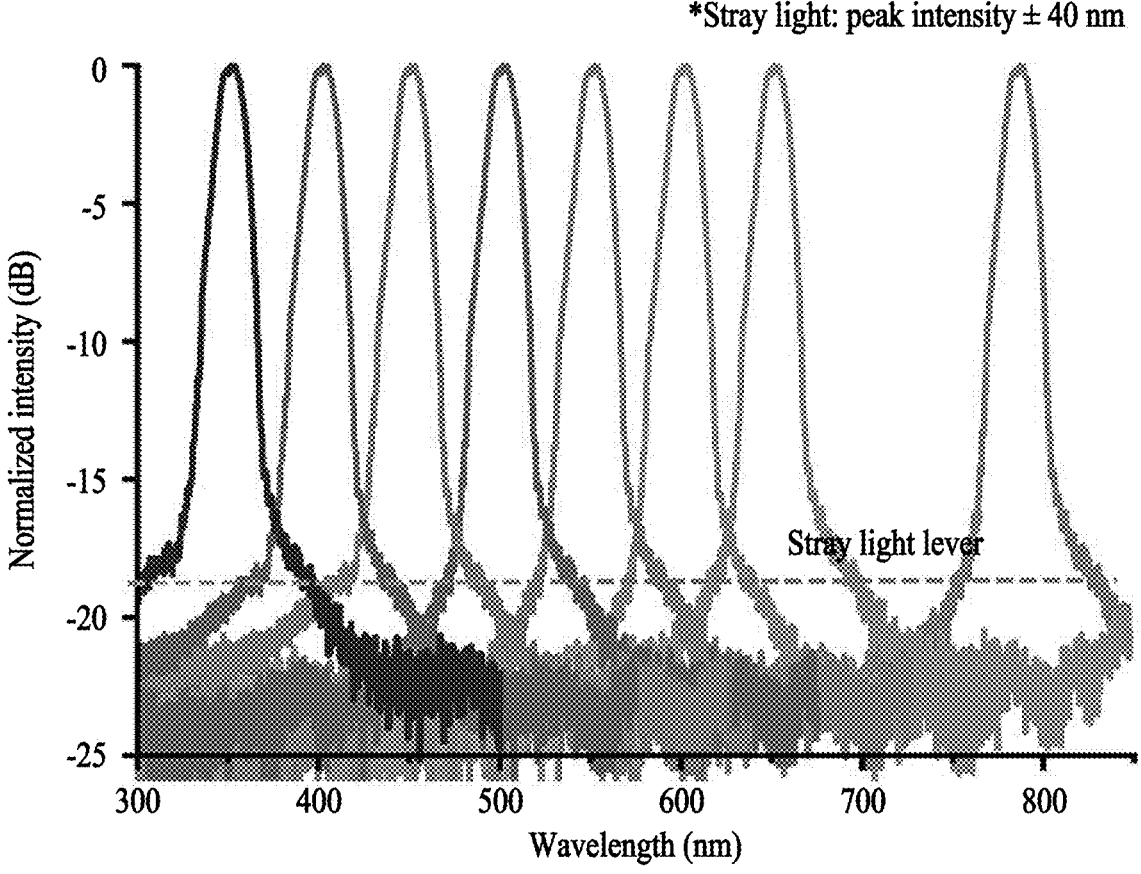
FIG. 6 illustrates an evaluation result of optical performance of an ultrathin micro-spectrometer of the disclosure according to an embodiment of the disclosure.

According to an embodiment of the disclosure, FIG. 6 shows an evaluation of the optical performance of the ultrathin micro-spectrometer having the back-reflection grating structure according to the disclosure, which is related to a stray light measurement diagram. In FIG. 6, it may be confirmed that a level of stray light a signal measured by the detector according to the disclosure corresponds to a commercially available level. That is, in the disclosure, the spectrometer may be designed to be ultrathin through the multi-reflection structure and the level of the stray light of the signal measured by the detector (sensor) may be lowered to the commercially available level, thereby utilizing the spectrometer in the analysis of the entire visible light region.

The disclosure relates to a method of manufacturing an ultrathin micro-spectrometer according to the disclosure, and according to an embodiment of the disclosure, the manufacturing method may include steps of forming a lens portion having a back-reflection grating structure; manufacturing a substrate layer; and assembling optical components.

According to an embodiment of the disclosure, the step of forming of the lens portion may include step S100 of forming a back-reflection grating structure; and step S200 of mounting the back-reflection grating structure on the lens. The configuration of each step is as described above for the ultrathin micro-spectrometer of the disclosure.

Figure 7:
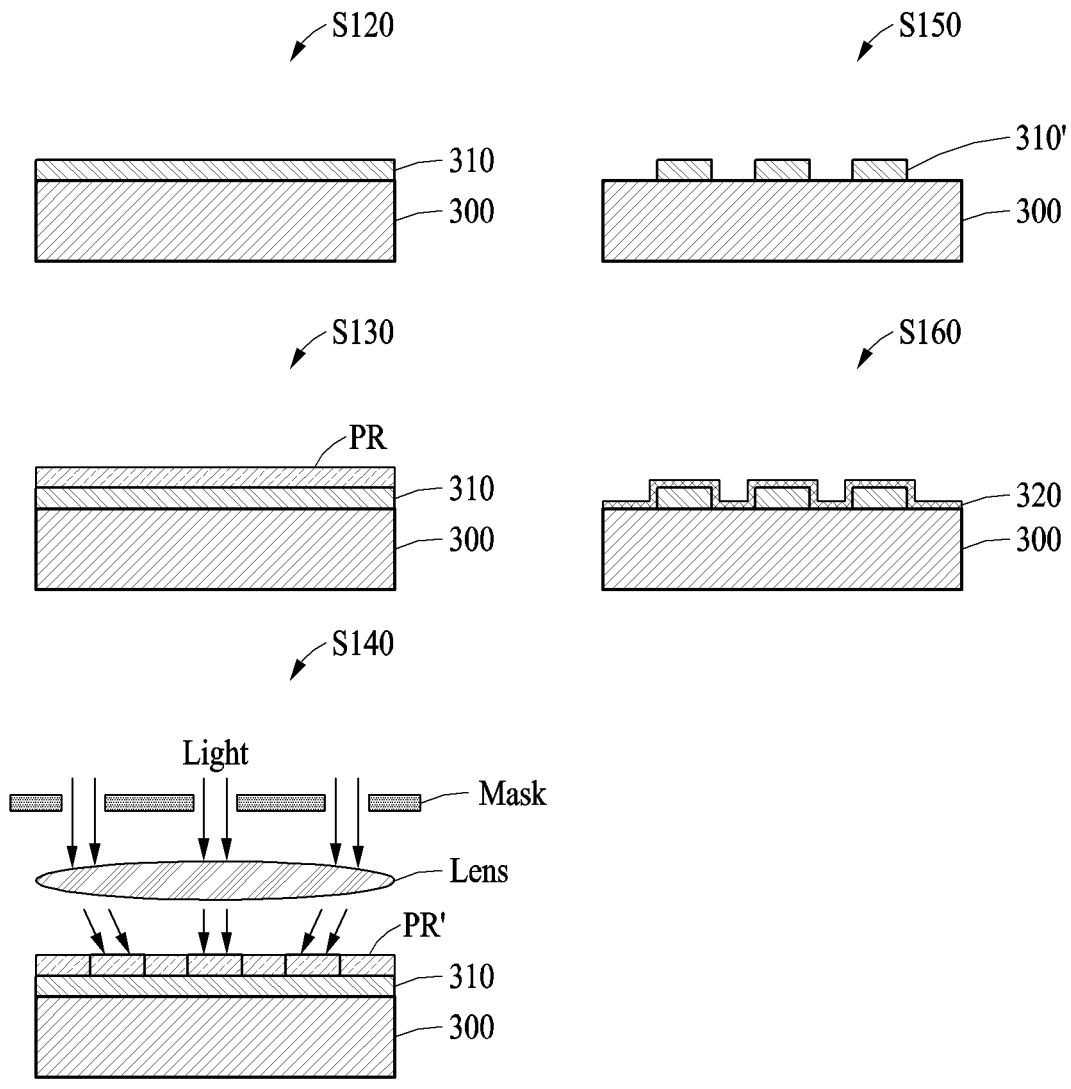
FIG. 7 illustrates an example of a process of a method of manufacturing an ultrathin micro-spectrometer of the disclosure according to an embodiment of the disclosure.

According to an embodiment of the disclosure, referring to FIG. 7, step S100 of forming of the reflective diffraction grating may include step S110 of preparing a base substrate; step S120 of forming an oxide layer on the base substrate; step S130 of forming a photoresist layer; step S140 of performing a photolithography process of the photoresist layer; step S150 of forming a diffraction grating by patterning the oxide layer; and step S160 of exposing the base substrate from the oxide layer by removing the photoresist, and depositing a metal layer in a diffraction grating region and a planar reflection region.

According to an embodiment of the disclosure, step S110 of preparing of the base substrate may be a substrate 300 containing a transparent material capable of transmitting light, and the substrate 300 may be a silicon substrate (e.g., a transparent Si wafer or a transparent SiC wafer), a sapphire substrate, a ceramic substrate, a glass substrate, a metal oxide substrate, a transparent plastic substrate, or the like, and may contain at least one or more of, for example, glass, alumina, aluminum oxide (e.g., sapphire), transparent plastic (e.g., a cellulose-based resin, polyethylene terephthalate (PET), polyethylene naphthalate (PEN), a polyethylene resin, a polyvinyl chloride resin, polycarbonate (PC), polyethersulfone (PES), polyetherether ketone (PEEK), polyphenylene sulfide (PPS), polyimide (PI), and polymethyl methacrylate (PMMA)), or a mixture thereof.

In an example of the disclosure, step S120 of forming of the oxide layer on the base substrate may be a step of depositing and/or coating the oxide layer 310 on and/or with at least a portion on the base substrate 300, for example, a portion where the diffraction grating structure is formed, and a method such as magnetron sputtering, thermal evaporation, chemical vapor deposition (CVD), plasma enhanced chemical vapor deposition (PECVD), atomic layer deposition (ALD), or electron beam deposition may be used but is not limited thereto.

In an example of the disclosure, the oxide layer 310 may be formed to have a thickness of 100 nm to 200 nm, and the oxide layer 310 may contain transparent oxide, may be, for example, oxide containing at least one or more of Ti, In, Ga, Zn, Sn, and Si, and may be ITO, IGZO, IZO, IGO, or silicon oxide (e.g., $SiO_2$). The oxide layer 310 may further contain silicon nitride (e.g., $Si_xN_y$, $Si_3N_4$), silicon oxynitride (Si-$O_xN_y$), and transparent nitride or transparent oxide semiconductor compound. The oxide may be desirably silicon oxide (e.g., $SiO_2$).

According to an embodiment of the disclosure, step S130 of forming of the photoresist layer may be a process of applying the photoresist layer (PR, e.g., GXR-601) to at least a portion or the entire portion on the oxide layer 310, a material may be selected according to the photolithography process, and the photoresist layer may be baked before the photolithography process.

According to an embodiment of the disclosure, step S140 of performing of the photolithography process of the photoresist layer may be a process of patterning the photoresist layer by the photolithography process, and any process may be applied without limitation as long as it is a photolithography process (e.g., projection lithography) well known in the field of the disclosure. For example, masks may be aligned and disposed on the photoresist layer, light exposure (e.g., exposure), bake, and/or development process are performed, and a bake (e.g., hard bake) process may be further performed after the development process.

According to an embodiment of the disclosure, in step S150 of forming of the diffraction grating by patterning the oxide layer, at least a portion of the oxide layer 310, on which the patterned photoresist layer is formed, may be patterned by wet etching or dry etching in a linear pattern usable as the diffraction grating, and the photoresist remaining after the etching may be removed. In some examples, the etching may be performed such that the base substrate is exposed between the linear patterns. For example, the etching may induce etching by configuring an appropriate etchant according to the components of the oxide layer, and the etchant may contain at least one or more of hydrofluoric acid, xenon difluoride ($XeF_2$), acetic acid, citric acid, hydrochloric acid, perchloric acid, and the like. For example, the dry etching may use sputter etching, reactive ion etching (RIE), vapor phase etching, and the like, but is not limited thereto.

According to an embodiment of the disclosure, in step S160 of depositing of the metal layer in the diffraction grating region and the planar reflection region, the photoresist remaining after the patterning of the oxide layer 310 may be removed, and the metal layer 320 (e.g., Al) may be deposited in the diffraction grating region and the planar reflection region with the same or different metal. For example, a method such as magnetron sputtering, vacuum deposition, ion plating, E-beam evaporation, thermal evaporation, CVD, PECVD, or ALD may be used but is not limited thereto.

In an example of the disclosure, a thickness of the metal layer 320 may be 50 nm to 100 nm, any metal may be applied to the metal layer 320 without limitation as long as it is metal having the function of light reflection, and in some examples, the metal layer may contain metal of Groups III, IV, and V of the periodic table of elements. In some examples, the metal layer may contain at least one or more selected from the group consisting of Al, In, Sn, Pb, Sb, Bi, Cu, Ag, Au, Zn, Cd, Hg, Sc, Y, La, Ti, Zr, Hf, V, Nb, Ta, Cr, Mo, W, Fe, Co, Ni, Ru, Rh, Pd, Os, Ir, Pt, Ce, Pr, Nd, Pm, Sm, Eu, Gd, Tb, Dy, Ho, Er, Tm, Yb, and Lu, or an alloy thereof. In some examples, the metal layer may contain silver (Ag), palladium (Pd), gold (Au), copper (Cu), bismuth (Bi), germanium (Ge), gallium (Ga), aluminum (Al), or an alloy thereof in consideration of high reflectivity and ease of manufacture.

According to an embodiment of the disclosure, in step S200 of mounting of the back-reflection grating structure on the lens, a surface of the base substrate having the back-reflection grating structure may be positioned on a flat rear surface of the lens and they may be assembled.

According to another embodiment of the disclosure, the back-reflection grating structure may be formed (e.g., step S100 may be performed) after the base substrate is disposed on the lens.

According to an embodiment of the disclosure, in the step of assembling the optical components, the substrate layer including a light incidence microslit and a planar reflector (e.g., Al film) may be formed and the optical components such as a lens portion, an image sensor, and the like may be assembled. For the substrate layer, the microslit may be formed in the substrate using photolithography, etching, or the like, and a metal layer may be deposited on the planar reflector region.

According to an embodiment of the disclosure, the components of the ultrathin micro-spectrometer of the disclosure may be arranged and assembled on a semiconductor substrate by appropriately using a method well known in the technical field of the disclosure, which is not specifically described here.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. An ultrathin micro-spectrometer comprising:
a lens portion comprising:
a convex lens having a convex front surface and a planar rear surface; and
a back-reflection grating layer which is formed on the planar rear surface of the convex lens and on the same surface of which a reflective diffraction grating and a first planar reflector are arranged;

a substrate layer which is disposed to be spaced apart from the lens portion and on which a light incidence microslit is formed;

a second planar reflector which is formed on the substrate layer; and a complementary metal-oxide-semiconductor (CMOS) sensor on which light reflected by the lens portion is focused, wherein the convex front surface of the convex lens faces towards the substrate layer.

2. The ultrathin micro-spectrometer of claim 1, wherein the back-reflection grating layer comprises:

a base substrate;

a reflective diffraction grating region which is formed on one surface of the base substrate; and a first planar reflector region which is formed on the same surface as the reflective diffraction grating region.

3. The ultrathin micro-spectrometer of claim 2, wherein the reflective diffraction grating is a plurality of linear patterns formed on the base substrate, and the linear patterns comprise an oxide containing at least one member selected from the group consisting of Ti, In, Ga, Zn, Sn and Si.

4. The ultrathin micro-spectrometer of claim 1, wherein the first planar reflector and the reflective diffraction grating comprise a metal coating layer, and the reflective diffraction grating comprises the metal coating layer which is the same as or different from the metal coating layer of the first planar reflector.

5. The ultrathin micro-spectrometer of claim 4, wherein the metal coating layer comprises:

at least one or more selected from a group consisting of silver (Ag), palladium (Pd), gold (Au), copper (Cu), bismuth (Bi), germanium (Ge), gallium (Ga), and aluminum (Al), or a mixture thereof.

6. The ultrathin micro-spectrometer of claim 4, wherein a thickness of the metal coating layer is 50 nanometers (nm) to 100 nm, and the metal coating layer is a single layer or a plurality of layers.

7. The ultrathin micro-spectrometer of claim 3, wherein the linear patterns comprise at least one or more of a period of 1 micrometer (μm) to 2 μm, a height of 100 nm to 200 nm, a line thickness of 500 nm to 900 nm, and a duty cycle of 0.4 to 0.5, and a cross-section of the linear pattern comprises at least one or more of a rectangle, a square, a lenticular shape, a semicircle, and a triangle.

8. The ultrathin micro-spectrometer of claim 2, wherein the base substrate is a transparent substrate, and the transparent substrate comprises at least one or more of glass, sapphire, a transparent wafer, and transparent plastic.

9. The ultrathin micro-spectrometer of claim 1, wherein light passing through the microslit is incident on the first planar reflector.

10. The ultrathin micro-spectrometer of claim 1, wherein a distance between the microslit and the first planar reflector is 4 mm to 8 mm.

11. The ultrathin micro-spectrometer of claim 1, wherein light incident through the microslit is collimated from the first planar reflector to the second planar reflector, and the light reflected by the second planar reflector is focused on the CMOS sensor through the back-reflection grating layer.

12. The ultrathin micro-spectrometer of claim 11, wherein the light focused on the CMOS sensor is visible light at a wavelength of 350 nm to 800 nm, and is focused light having multiple wavelengths.

13. The ultrathin micro-spectrometer of claim 2, wherein the reflective diffraction grating is a plurality of linear patterns formed on the base substrate, and the linear patterns comprise silicon oxide.

14. The ultrathin micro-spectrometer of claim 3, wherein the linear pattern has a line thickness of 0.7 μm to 0.8 μm and a period of 1 μm to 1.66 μm.

* * * * *